(12) United States Patent
White

(10) Patent No.: US 8,708,515 B2
(45) Date of Patent: Apr. 29, 2014

(54) COMBINATION SOLAR AND OIL TORCH

(75) Inventor: Ron White, North Prairie, WI (US)

(73) Assignee: Lamplight Farms Incorporated, Menomonee Falls, WI (US)

( * ) Notice: Subject to any disclaimer, the term of this patent is extended or adjusted under 35 U.S.C. 154(b) by 0 days.

(21) Appl. No.: 13/560,741

(22) Filed: Jul. 27, 2012

(65) Prior Publication Data

US 2013/0027918 A1 Jan. 31, 2013

Related U.S. Application Data

(60) Provisional application No. 61/512,677, filed on Jul. 28, 2011.

(51) Int. Cl.
*F21V 17/02* (2006.01)

(52) U.S. Cl.
USPC .......................... 362/157; 431/321

(58) Field of Classification Search
USPC ............... 362/209, 157; 431/2, 320–325, 253
See application file for complete search history.

(56) References Cited

U.S. PATENT DOCUMENTS

| | | | |
|---|---|---|---|
| 1,976,655 A | 3/1931 | Johns | |
| 4,830,606 A | 5/1989 | Dillinger | |
| 5,205,730 A | 4/1993 | Capdeville | |
| 5,855,426 A | 1/1999 | Burns | |
| 6,651,647 B2 | 11/2003 | Waters | |
| 6,685,337 B2 | 2/2004 | Klees | |
| 6,929,380 B2 | 8/2005 | Logan et al. | |
| 7,063,438 B2 | 6/2006 | Sze-Tai | |
| 2007/0097673 A1 | 5/2007 | Livesay | |
| 2007/0259297 A1* | 11/2007 | Liu et al. | 431/153 |
| 2008/0232094 A1 | 9/2008 | Ramsdell | |
| 2009/0207597 A1 | 8/2009 | Silver | |

FOREIGN PATENT DOCUMENTS

CN 101545583 9/2011

* cited by examiner

*Primary Examiner* — Anne Hines
(74) *Attorney, Agent, or Firm* — Fellers, Snider, Blankenship, Bailey & Tippens, P.C.

(57) ABSTRACT

A hybrid torch having a liquid fuel reservoir, a flame bowl, a wick that moves fuel from the reservoir to the flame bowl for combustion, and a cap that selectively covers the flame bowl and provides at least one light emitting diode (LED) for illuminating an area under the cap.

16 Claims, 8 Drawing Sheets

COMBINATION SOLAR AND OIL TORCH

CROSS REFERENCE TO RELATED APPLICATIONS

This application claims the priority of U.S. Provisional Patent Application No. 61/512,677 entitled "COMBINATION SOLAR AND OIL TORCH," filed Jul. 28, 2011, the contents of which are hereby incorporated by reference.

FIELD OF THE INVENTION

The present disclosure relates to lighting systems in general and, more particularly to solar and oil powered lamps.

BACKGROUND OF THE INVENTION

Solar powered decorative lamps are increasingly common as the cost to produce solar panels has dropped. LEDs are more durable, produce less heat, and require less energy to operate than incandescent bulbs. Falling LED prices has made their incorporation into decorative lighting a realistic solution to the relatively expensive step of increasing battery capacity to operate incandescent bulbs in a satisfactory manner.

On the other hand, some consumers prefer the ambiance and natural lighting provided by lawn torches. Lawn torches may also be provided with insect repellant and/or fragrant oils. However, lawn torches must always be fueled and attended when in use and do not offer the automation of LED based decorative lighting.

What is needed is a system for addressing the above, and related, issues.

SUMMARY OF THE INVENTION

The invention of the present disclosure, in one aspect thereof, comprises a hybrid torch having a liquid fuel reservoir, a flame bowl, a wick that moves fuel from the reservoir to the flame bowl for combustion, and a cap that selectively covers the flame bowl and provides at least one light emitting diode (LED) for illuminating an area under the cap.

The torch may have a torch body that contains the fuel reservoir and is configured to retain the cap over the flame bowl. The flame bowl may be sized to create enhanced flame effects.

The cap may contain a rechargeable battery for powering the LED and a solar panel for recharging the battery. The cap may provide a plurality of LEDs of a plurality of colors. The cap may also include an LED controller that provides a non-steady illumination effect for the LED.

The invention of the present disclosure, in another aspect thereof, comprises a hybrid torch having a torch body containing a liquid fuel reservoir, a flame bowl affixed to the torch body, and a wick for transporting liquid for from the liquid fuel reservoir to the flame bowl for combustion. The torch includes a cap having a solar panel for recharging a battery and an light emitting diode (LED), the cap selectively affixed to the torch body such that the cap covers the flame bowl and is removable to expose the flame bowl.

In some embodiments, the cap has an LED controller that selectively recharges a battery using the solar panel. The cap may have a light sensor connected to the LED controller. The LED controller may switch between charging the battery and using the battery power to illuminate the LED based on a level of light detected by the light sensor. The LED controller may illuminate the LED to provide a non-steady illumination effect. In some embodiments, the cap provides a plurality of LEDs of a plurality of different colors.

In some embodiments of the torch the cap further comprises a top having the solar panel on an upper side thereof and having the LED on a lower side thereof such that the LED illuminates the flame bowl when the activated and the cap is placed on the torch body. The cap may further comprise a translucent globe attached to the lower side thereof. In some embodiments, the torch body further comprises an inner shell and an outer webbing.

The invention of the present disclosure, in another aspect thereof comprises a hybrid torch cap for use with a liquid fueled torch. The cap comprises a solar panel, a light emitting diode (LED), and an LED controller connected to the solar panel and the LED. The cap provides a mount for affixing the cap to a torch body. The LED controller utilizes the solar panel to recharge a battery and selectively utilizes the battery to power the LED.

In some embodiments, the solar panel is located on an upper surface of a top of the cap and the LED is located on a lower surface of the top of the cap. A translucent globe may be affixed to the lower surface of the top of the cap. In some cases a plurality of LEDs of a plurality of different colors are provided. The LED controller may also provide for a non-steady state illumination effect of the LED.

DETAILED DESCRIPTION OF THE PREFERRED EMBODIMENTS

Figure 1A:
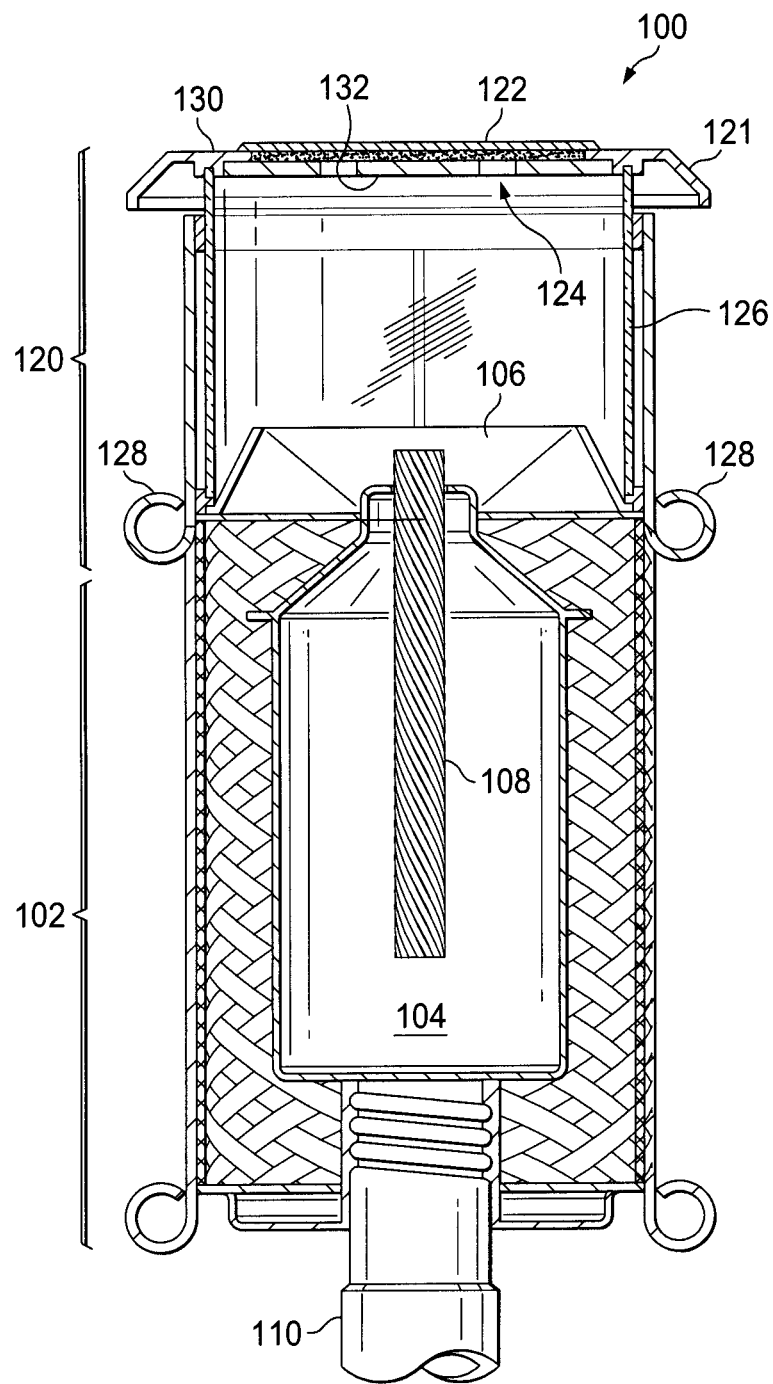
FIG. 1A is a side cutaway view of a hybrid solar torch according to the present disclosure.

Referring now to FIG. 1A, a side cutaway view of a hybrid solar torch according to the present disclosure is shown. In the present embodiment the torch 100 comprises a body 102. The body 102 may be made from a metal or polymer or a combination thereof. In some embodiments the body 102 may be decorative or textured.

The body 102 may contain a fuel reservoir 104. The fuel reservoir 104 may be made from a metal or polymer and may contain a supply of liquid fuel. The liquid fuel may contain citronella or other additives to provide for insect repellency and/or scent dispersal. The reservoir 104 may be attached to a flame bowl 106.

The flame bowl 106 may be a metal or another heat resistant material. In the present embodiment a wick 108 proceeds from the reservoir 104 to the flame bowl 106. In some embodiments the wick 108 may be a resilient fiberglass wick. The wick 108 functions to draw fuel from the reservoir 104 to the flame bowl 106. It will be appreciated that the flame bowl 106 can take many sizes and shapes. For example, in the present embodiment the flame bowl 106 is enlarged to create a large flame effect when the wick 108 is ignited.

The body 102 may be mounted on a pole 110 for placement in the ground. In other embodiments, the body 102 may be configured to stand freely on a table or other surface.

A cap 120 has one or more mounts 128 that are configured to allow the cap 120 to affix securely to the body 102. The mounts 128 may be integral with the cap 120 and may allow the cap to affix to the body 102 via friction fit, interference fit, threading, or by other means. Thus, in the present embodiment, the cap 120 is removable or selectively affixed to the body 102. The cap 120 may be removed prior to ignition of the wick 108. The cap 120 serves to cover and protect the wick 108 and/or the reservoir 104. The cap 120 may also be textured or decorative to match the exterior of the body 102.

In the present embodiment, the cap 120 has a top 121 with a solar panel 122 on an upper surface 130. As will be described in greater detail below, one purpose of the solar panel 122 is to provide power to illuminate one or more light emitting diodes (LEDs) 124, which may be positioned on a lower surface 132 of the cap 120, as better seen in FIG. 1B.

The cap 120 may also provide a globe or cover 126 on or below the lower surface 132 to provide further protection to the wick 108, the flame bowl 106 and/or the LEDs 124. The globe 126 may be translucent (including transparent) to allow the light from the LEDs to be seen when the cap is placed on the body 102. The globe 126 may also be frosted or otherwise provided with a decorative finish. The globe 126 may comprise plastic, glass, or another material.

Figure 1B:
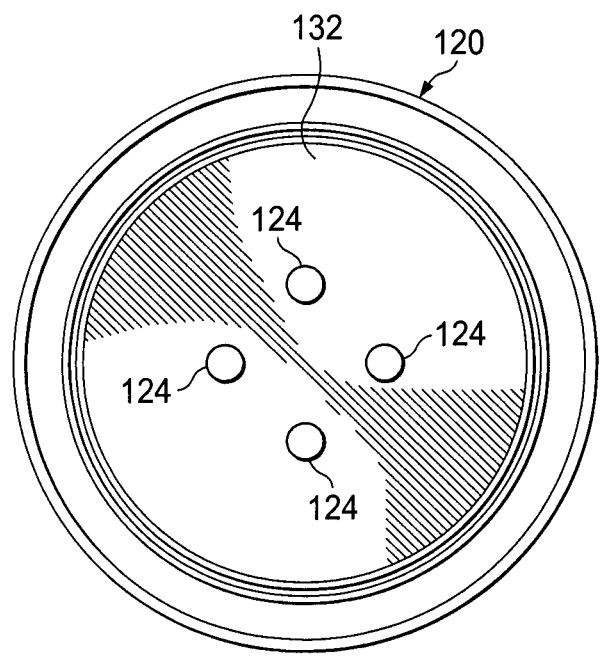
FIG. 1B is an inferior view of the cap of the torch of FIG. 1A.

Referring now to FIG. 1B, an inferior view of the cap 120 of the torch 100 of FIG. 1A is shown. In the present embodiment, a number of LEDS 124 are shown on the bottom surface 132 of the top 121 of the cap 120. The LEDs 124 may be the identical or they may be different colors. Non-limiting examples of the contemplated colors of the LEDs 124 include amber, white, red, yellow, and blue. As will be described in greater detail below, the LEDs 124 may be selectively operated to provide various illumination options for flashing or flickering effects onto the area of the flame bowl 106. In such a manner, even when conditions are not suitable to operate the torch 100 using the liquid fuel from the reservoir 104, the various LEDs 124 may be used to provide realistic light effect. Such effect may also be referred to as non-steady illumination effects. It will also be appreciated that LEDs 124 could be positioned on the cap 120 elsewhere than on the lower surface 132 (instead of, or in addition to, the shown locations).

Figure 2:
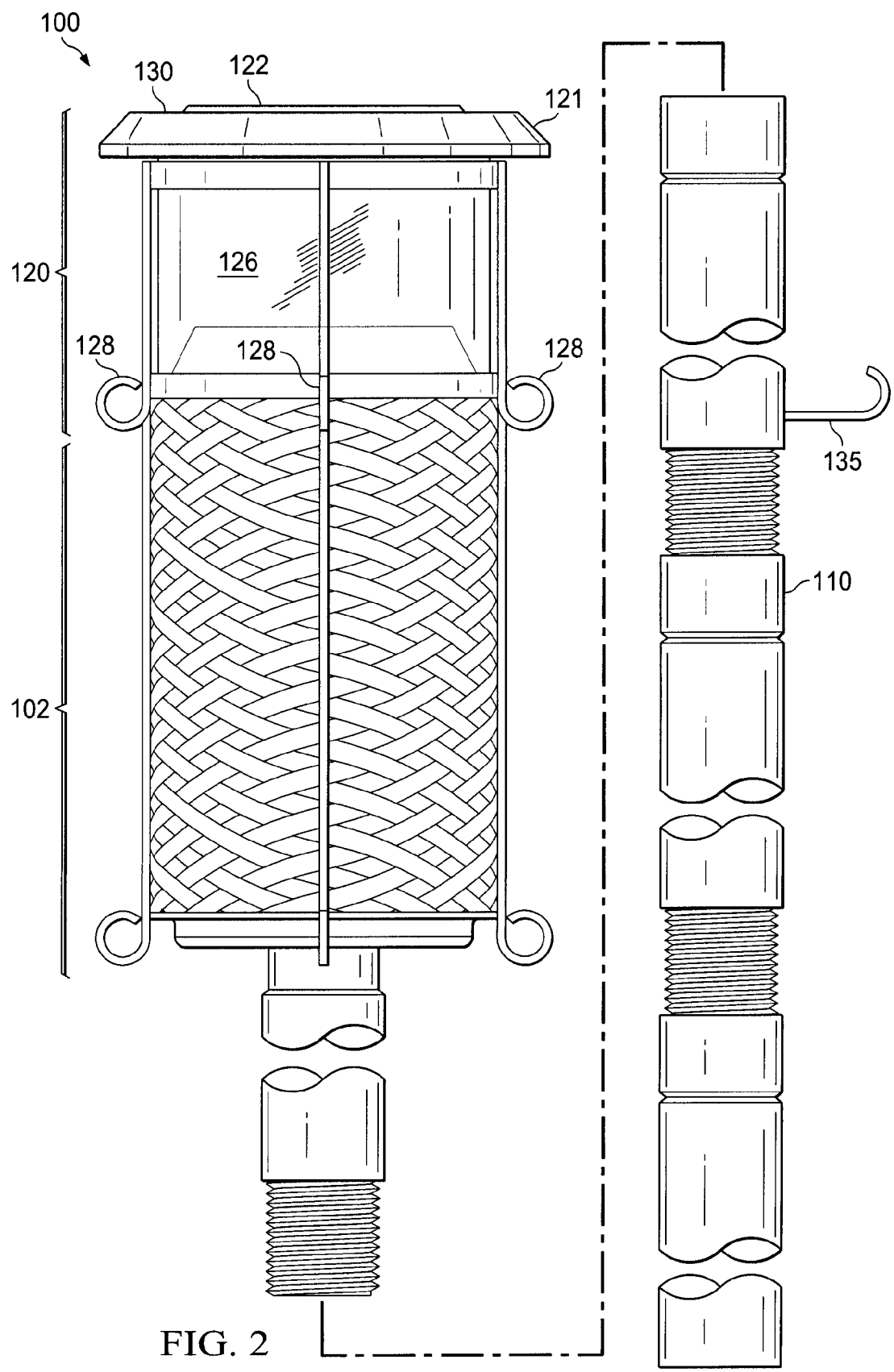
FIG. 2 is a side view of the torch of FIG. 1A.

Referring now to FIG. 2, a side view of the torch of FIG. 1A is shown. Here it can be seen that the cap 122 sits atop the body 102 and covers or protects the wick 108 and/or flame bowl 106 when the torch is not ignited. The globe 126 at least partially surrounds the firebowl 106 and/or LEDs 124. The solar panel 122 on the upper surface 130 of the top 121 the cap 120 may be exposed to sunlight or other sources of light throughout the day to selectively charge one or more batteries as explained below. When the LEDs 124 are operational, the translucent or transparent globe 126 will allow the torch 100 to be seen as operational. One or more hangers 135 may be provided on the pole 110 and/or body 102 for hanging the cap 120 when it is not in use.

Figure 3:
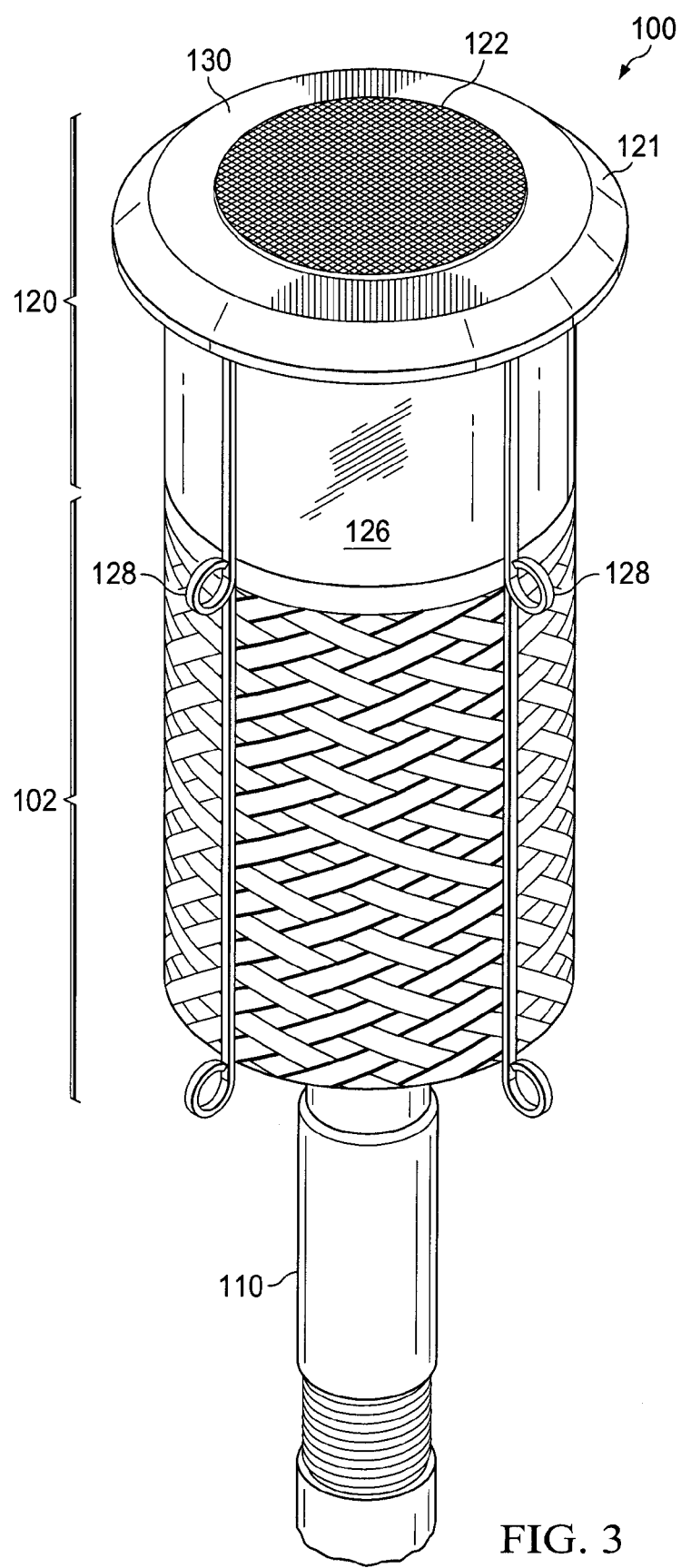
FIG. 3 is a perspective view of the torch of FIG. 1A

Referring now to FIG. 3, a perspective view of the torch of FIG. 1A is shown. From this viewpoint it can be appreciated that in the present embodiment the body 102 is generally cylindrical as is the globe 126. The cap 120 has a roughly circular top 121 exposing the solar panel 122. It is understood, however, that the present disclosure is not so limited to the shapes given here only as examples.

Figure 4B:
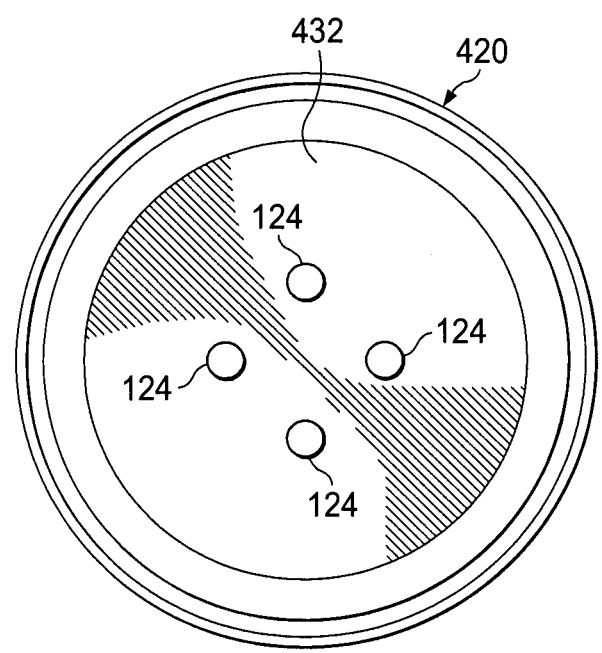
FIG. 4B is an inferior view of the cap of the torch of FIG. 4A.
Figure 4A:
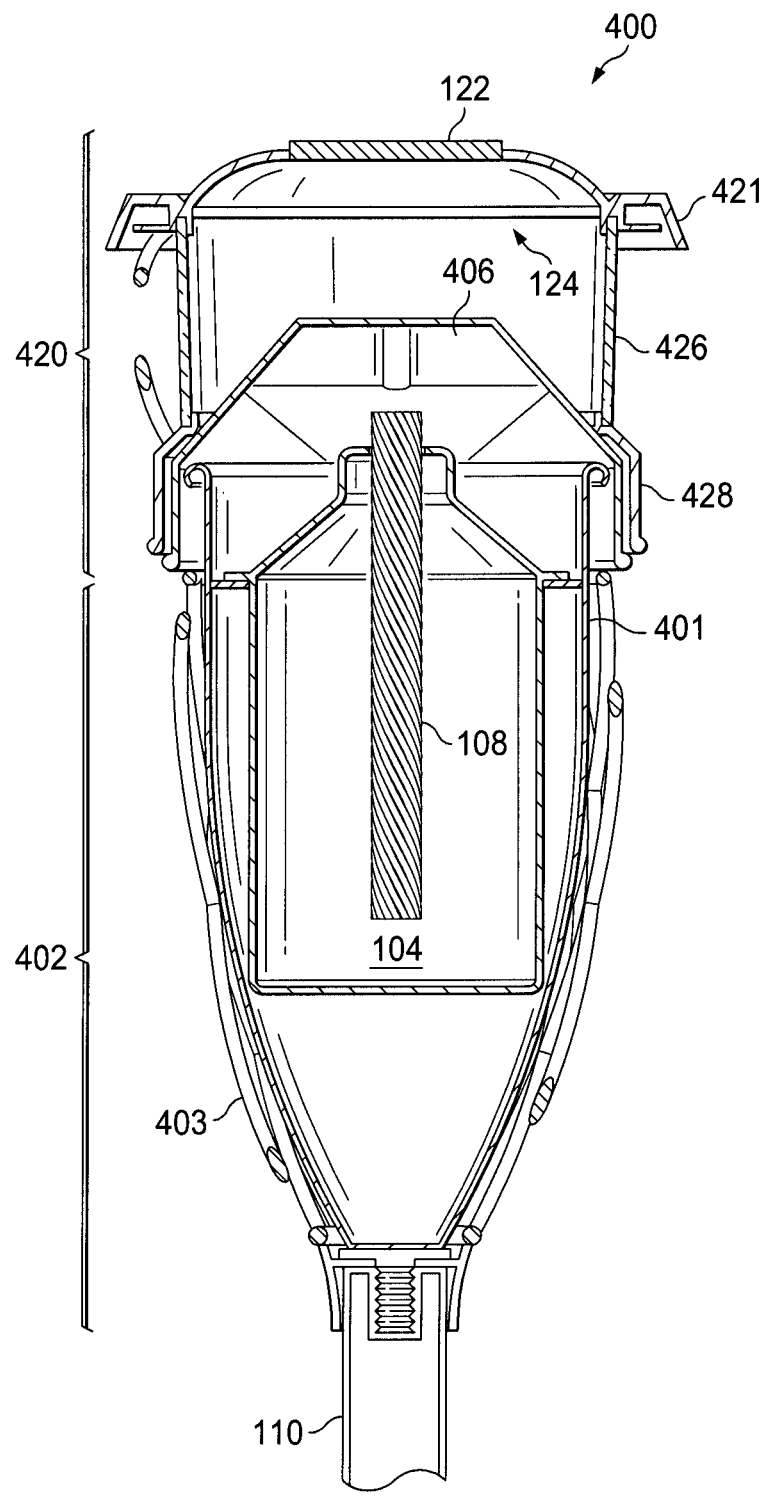
FIG. 4A is a side cutaway view of another hybrid solar torch according to the present disclosure.

Referring now to FIG. 4A, a side cutaway view of another hybrid solar torch according to the present disclosure is shown. The torch 400 is similar in many respects to the torch 100 previously described. However, in the present embodiment the torch 400 provides a body 402 that comprises an inner shell 401 surrounded by decorative webbing 403. The inner shell 401 may be a polymer or glass, while the decorative webbing 403 may be a metal or polymer. In some embodiments, the decorative webbing will be structural. However, in other embodiments the shell 401 will be sufficient to maintain the structural integrity of the body 402 and the webbing 403 will be strictly decorative. The body 402 contains a fuel reservoir 104 connected to a flame bowl 406. It can be seen from FIG. 4A that the flame bowl 406 of the present embodiment has a different shape than the flame bowl 106 of previous embodiments. Therefore it will therefore be appreciated that many different styles and types of flame bowls 406 may be utilized with various embodiments of the present disclosure. A wick 108 proceeds from the reservoir 104 to the flame bowl 406 for transporting liquid fuel to the flame bowl 106.

The torch 400 also comprises a cap 420. The cap 420 may also provide a solar panel 122 on an upper surface 430 of a top 421 and/or one or more LEDs 124 on a lower surface 432 of the top 421. The cap 420 also provides a translucent and possibly decorative globe 426. The globe 426 may serve to protect the LEDs 124 as well as the wick 108 and/or flame bowl 406. Once again, the globe 426 may comprise plastic or glass or another material. The cap 420 may provide a mount 428 for selectively attaching to the torch body 402. As before the mount may be threaded or may connect via a friction or interference fit. In some embodiments, the cap 420 may attach to the torch body 402 in a substantially water proof or weather proof manner. O-rings or seals (not shown) may be provided as necessary to allow the torch 400 to remain outdoors in bad weather.

Referring now to FIG. 4B, an inferior view of the lower surface 432 is shown. Once again, a plurality of LEDs 124 are shown. In the present embodiment four separate LEDs 124 are shown. However, it is understood that more or fewer LEDs may be present. In some embodiments the LEDs 124 are colored, and each may be a different color. It is also understood that the LEDs 124 may be placed elsewhere on the cap 420 than shown. For example, one or more LEDs may be placed to illuminate in a direction other than down toward the flame bowl 406.

Figure 5:
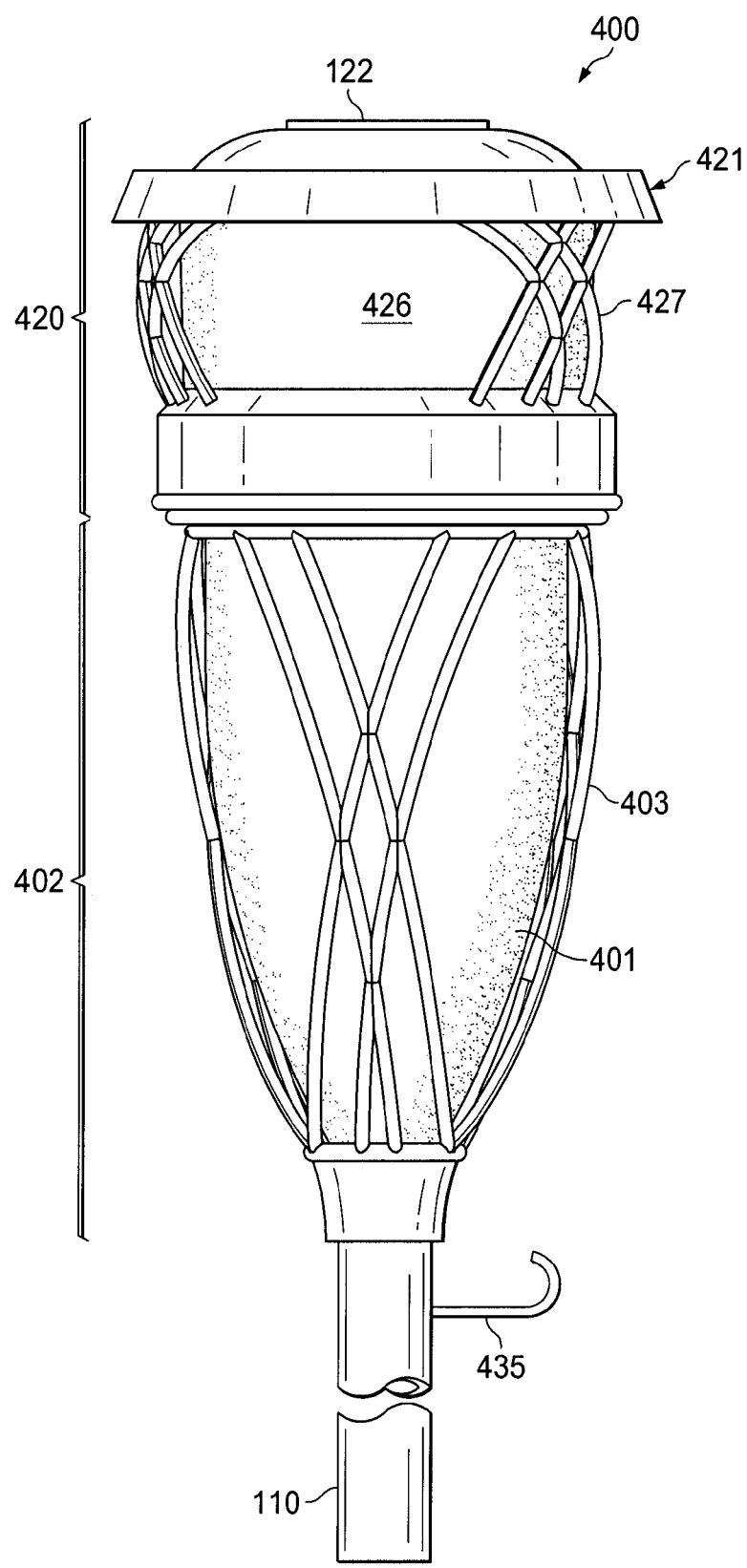
FIG. 5 is a side view of the torch of FIG. 4A.

Referring now to FIG. 5, a side view of the torch 400 of FIG. 1A is shown. Here the external appearance of the torch 400 can be seen. The body 402 can be seen to comprise the shell 401, at least partially surrounded by the decorative webbing 403, which may also be structural. Similarly, the cap 420 can be seen to comprise the globe 426 which may also be partially surrounded by decorative and/or structural webbing 427. As with previous embodiments, one or more hooks or hangers 435 may be provided on the body 402 and/or pole 110 for securing and/or retaining the cap 420 when it is not in use, or when the torch 400 is operated utilizing liquid fuel.

Figure 6:
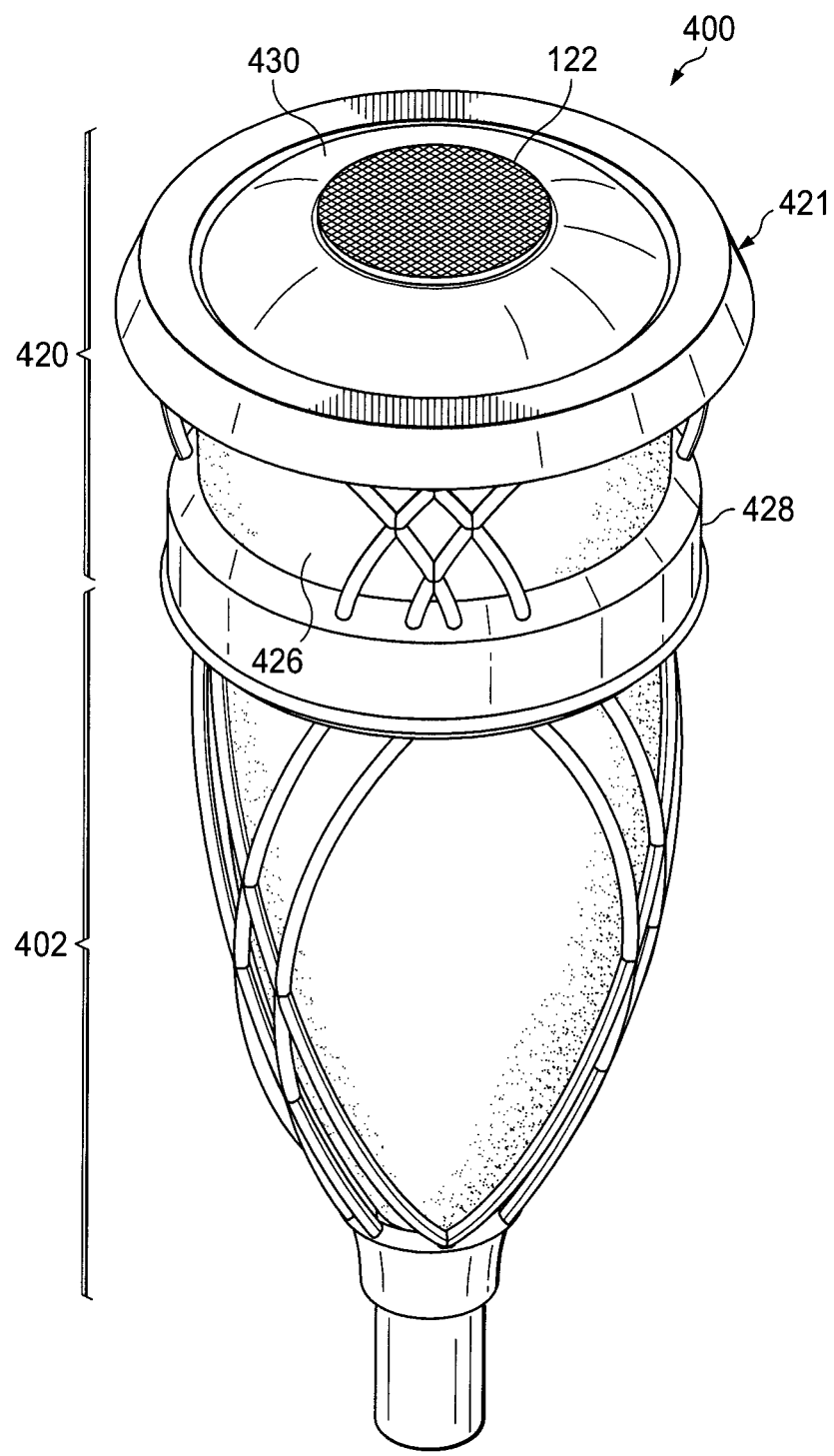
FIG. 6 is a perspective view of the torch of FIG. 4A.

Referring now to FIG. 6, a perspective view of the torch 400 of FIG. 4A is shown. Once again, the cap 420 can be seen having a generally circular top 421, while in this case the torch body 402 can be seen to have a conically tapering profile. In the present embodiment, the globe 426 has a generally cylindrical shape; although, in other embodiments it may have other shapes.

Figure 7:
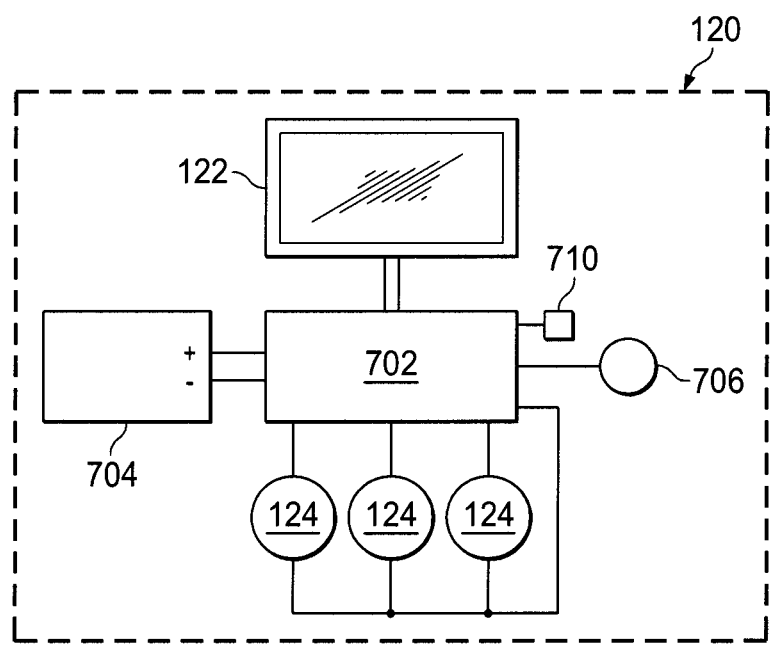
FIG. 7 is a simplified schematic diagram of an electrical lighting system suitable for use with the torches of the present disclosure.

Referring now to FIG. 7, a simplified schematic diagram of an electrical lighting system suitable for use with the torches of the present disclosure is shown. In some embodiments, each of the components shown in FIG. 7, is physically connected to or associated with the cap of a torch. Thus, in the present view, the cap 120 of FIG. 1A is shown as a dotted line box outline. However, it is understood that the configuration of FIG. 7 would be equally suitable for use with the cap 420 of FIG. 4A.

As previously described, the cap 120 provides a solar panel 122. The solar panel 122 may be interconnected with a controller 702 and/or battery 704. The controller also connects to the LED's 124 to control their operation. The controller 702 may be a solid state controller programmed for operation at the time the torch or cap is assembled. However, it could also be equipped with simple controls (not shown) to allow the user to alter the control pattern of the LEDs 124. An on/off switch (not shown) may also be provided to allow the illumination effects of the cap 120 to be turned completely off.

The battery 704 may be a plurality of batteries in some embodiments. The battery 704 may be built in to the cap 120, or it may be user replaceable or serviceable. The battery 704 may be lithium, nickel, or alkaline based, or may be based on another chemistry. The size of the battery may be custom chosen to fit the confines of the cap 120. However, the cap 120 may be sized to allow common sizes of consumer batteries to be utilized (e.g., CR2032, or AAA). The voltage may be chosen based upon the load of the LEDs 124 and the controller 702.

The controller 702 may also be connected with a light sensor 706. The sensor 706 detects the amount of light being received at the location of the cap 120. This information is fed to the controller 702 for use in determining when to activate the charging function and/or when to illuminate the LEDs 124. For example, when a great deal of light is detected at the light sensor 706, the controller 702 may place the solar panel 122 in connection to the battery 704 in order to allow the battery 704 to be charged when lighting conditions are adequate. When the controller 702 detects a relatively low amount of light at the light sensor 706, it may disconnect the solar panel 122 from its charging function with the battery 704. The controller 702 may be set to automatically begin utilizing the battery 704 to illuminate one or more of the plurality of LEDs 124. As described, the LEDs 124 may be of different colors or may be of the same color. Each of these may be controlled by the controller 702 to remain lit constantly or to flash or dim according to a predetermined interval implemented in the controller 702. In some embodiments, the flashing or dimming of the LEDs 124 may be controlled by the controller 702 to replicate the non-steady illumination that may be provided by a flickering flame. In some embodiments, different control patterns for the LEDs 124 may be selected based upon the amount of light received.

It will be appreciated that, in addition to the functions previously described where the torches 100, 400 operate either off of the liquid fuel contained in the reservoir 104 or the electric lighting provided by the caps 120, 420, the caps 120, 420 may also be utilized at the same time that the liquid fuel from the reservoir 104 is being utilized. It is contemplated that in such uses the torches 100, 400 will have the caps 120, 420 removed and placed on a table or other location. Such an arrangement allows for concurrent operation of the liquid fueled portion of the torches 100, 400 and the electrical powered caps 120, 420. Following use, the caps 120, 420 may be replaced on their respective torches and/or allowed to recharge the battery 704 utilizing the solar panel 122 when lighting conditions are sufficient.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. A hybrid torch comprising:
a liquid fuel reservoir;
a flame bowl;
a wick that moves fuel from the reservoir to the flame bowl for combustion; and
a cap that selectively covers the flame bowl and provides at least one light emitting diode (LED) for illuminating an area under the cap;
wherein the cap contains a rechargeable battery for powering the LED and a solar panel for recharging the battery.

2. A hybrid torch comprising:
a liquid fuel reservoir,
a flame bowl;
a wick that moves fuel from the reservoir to the flame bowl for combustion; and
a cap that selectively covers the flame bowl and provides at least one light emitting diode (LED) for illuminating an area under the cap;
wherein the cap provides a plurality of LEDs of a plurality of colors.

3. A hybrid torch comprising:
a liquid fuel reservoir;
a flame bowl;
a wick that moves fuel from the reservoir to the flame bowl for combustion; and
a cap that selectively covers the flame bowl and provides at least one light emitting diode (LED) for illuminating an area under the cap;
wherein the cap further comprises an LED controller that provides a non-steady illumination effect for the LED.

4. A hybrid torch comprising:
a torch body containing a liquid fuel reservoir;
a flame bowl affixed to the torch body;
a wick for transporting liquid for from the liquid fuel reservoir to the flame bowl for combustion; and
a cap having a solar panel for recharging a battery and an light emitting diode (LED), the cap selectively affixed to the torch body such that the cap covers the flame bowl and is removable to expose the flame bowl.

5. The torch of claim 4, wherein the cap further comprises an LED controller that selectively recharges a battery using the solar panel.

6. The torch of claim 5, wherein the LED controller illuminates the LED to provide a non-steady illumination effect.

7. The torch of claim 4, wherein the cap further comprises a light sensor connected to the LED controller and the LED controller switches between charging the battery and using the battery power to illuminate the LED based on a level of light detected by the light sensor.

8. The torch of claim 4, wherein the cap further comprises a plurality of LEDs of a plurality of different colors.

9. The torch of claim 4, wherein the cap further comprises a top having the solar panel on an upper side thereof and having the LED on a lower side thereof such that the LED illuminates the flame bowl when the activated and the cap is placed on the torch body.

10. The torch of claim 9, wherein the cap further comprises a translucent globe attached to the lower side thereof.

11. The torch of claim 4, wherein the torch body further comprises an inner shell and an outer webbing.

12. A hybrid torch cap for use with a liquid fueled torch, the cap comprising:
- a solar panel;
- a light emitting diode (LED);
- an LED controller connected to the solar panel and the LED; and
- a mount for affixing the cap to a torch body;
- wherein the LED controller utilizes the solar panel to recharge a battery and selectively utilizes the battery to power the LED.

13. The hybrid torch cap of claim 12, wherein the solar panel is located on an upper surface of a top of the cap and the LED is located on a lower surface of the top of the cap.

14. The hybrid torch cap of claim 13, further comprising a translucent globe affixed to the lower surface of the top of the cap.

15. The hybrid torch cap of claim 12, further comprising a plurality of LEDs of a plurality of different colors.

16. The hybrid torch cap of claim 12, wherein the LED controller provides for a non-steady state illumination effect of the LED.

* * * * *